US010061345B2

(12) United States Patent
Bauknecht et al.

(10) Patent No.: US 10,061,345 B2
(45) Date of Patent: Aug. 28, 2018

(54) APPARATUS AND METHOD FOR CONTROLLING AN AUTOMATED INSTALLATION

(71) Applicant: PILZ GMBH & CO. KG, Ostfildern (DE)

(72) Inventors: Jochen Bauknecht, Ostfildern (DE); Oliver Klamser, Ostfildern (DE); Reinhard Sperrer, Ostfildern (DE); Stefan Woehrle, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 4 days.

(21) Appl. No.: 15/458,246

(22) Filed: Mar. 14, 2017

(65) Prior Publication Data

US 2017/0269631 A1    Sep. 21, 2017

(30) Foreign Application Priority Data

Mar. 15, 2016 (DE) .................. 10 2016 104 767

(51) Int. Cl.
*G06F 1/12* (2006.01)
*G06F 1/08* (2006.01)
(Continued)

(52) U.S. Cl.
CPC ............ *G06F 1/12* (2013.01); *G05B 9/02* (2013.01); *G05B 19/0428* (2013.01); *G06F 1/08* (2013.01);
(Continued)

(58) Field of Classification Search
CPC ..... G06F 1/12; G06F 1/14; G06F 1/10; G06F 5/06; G11C 7/22
See application file for complete search history.

(56) References Cited

U.S. PATENT DOCUMENTS 5,572,211 A * 11/1996 Erhart ................ G09G 3/2011
                                                    341/144
5,999,060 A * 12/1999 Zuta .................... H03L 7/085
                                                    331/1 A
(Continued)

FOREIGN PATENT DOCUMENTS

DE        42 15 380 A1    11/1993
DE    10 2005 032 877 A1    6/2006
(Continued)

OTHER PUBLICATIONS

European Search for EP 17 16 0181; dated Jul. 17, 2017; 7 pp.

*Primary Examiner* — Zahid Choudhury
(74) *Attorney, Agent, or Firm* — Harness, Dickey & Pierce, P.L.C.

(57) ABSTRACT

An apparatus for controlling an automated installation has a first controller and a second controller that are connected to one another via a communication network. The first and second controllers each have a local clock and execute control tasks. The first and second controllers each further have a synchronization service that is used to synchronize the respective local clocks to a common reference clock. A timer repeatedly sends a trigger message to the first and second controllers. Each of the two controllers, on receiving the trigger message, determines a local time. The controllers interchange the respective local time and each compute a difference between their own local time and the local time obtained from the other controller. On the basis of the difference, each of the two controllers controls a local actuator.

14 Claims, 3 Drawing Sheets

(51) Int. Cl.
    *G06F 9/48*           (2006.01)
    *H04L 12/26*        (2006.01)
    *G05B 9/02*          (2006.01)
    *G05B 19/042*      (2006.01)
    *H04J 3/06*          (2006.01)
    *H04L 7/00*          (2006.01)

(52) U.S. Cl.
    CPC .......... *G06F 9/4881* (2013.01); *H04J 3/0644* (2013.01); *H04J 3/0655* (2013.01); *H04J 3/0682* (2013.01); *H04L 7/0008* (2013.01); *H04L 43/0852* (2013.01); *G05B 2219/25039* (2013.01)

(56) References Cited

U.S. PATENT DOCUMENTS

| | | | | |
|---|---|---|---|---|
| 7,058,838 | B2* | 6/2006 | Xu | G06F 1/14 368/46 |
| 7,366,774 | B2 | 4/2008 | Gibart et al. | |
| 7,715,559 | B2* | 5/2010 | Rainbolt | H04K 1/00 370/509 |
| 8,037,296 | B2* | 10/2011 | Kune | H04L 63/123 380/255 |
| 2002/0169993 | A1* | 11/2002 | Woods | G05B 19/0421 713/400 |
| 2003/0117899 | A1 | 6/2003 | Eidson | |
| 2006/0072840 | A1* | 4/2006 | Gautier | H04N 19/60 382/233 |
| 2007/0076787 | A1* | 4/2007 | Miller | H04B 1/70753 375/149 |
| 2009/0222589 | A1 | 9/2009 | Kirsch et al. | |
| 2009/0292913 | A1* | 11/2009 | Kune | H04L 63/123 713/150 |
| 2010/0005332 | A1* | 1/2010 | Simon | G06F 1/12 713/400 |
| 2010/0064163 | A1* | 3/2010 | Choi | G06F 1/12 713/401 |
| 2010/0166022 | A1 | 7/2010 | Cho | |
| 2011/0016362 | A1 | 1/2011 | Holzaepfel et al. | |
| 2012/0099447 | A1* | 4/2012 | Bhaskaran | H04L 43/0811 370/252 |

FOREIGN PATENT DOCUMENTS

| | | | |
|---|---|---|---|
| DE | 10 2008 007 672 | A1 | 7/2009 |
| DE | 10 2008 010 536 | A1 | 8/2009 |
| EP | 1 521 145 | A1 | 4/2005 |

\* cited by examiner

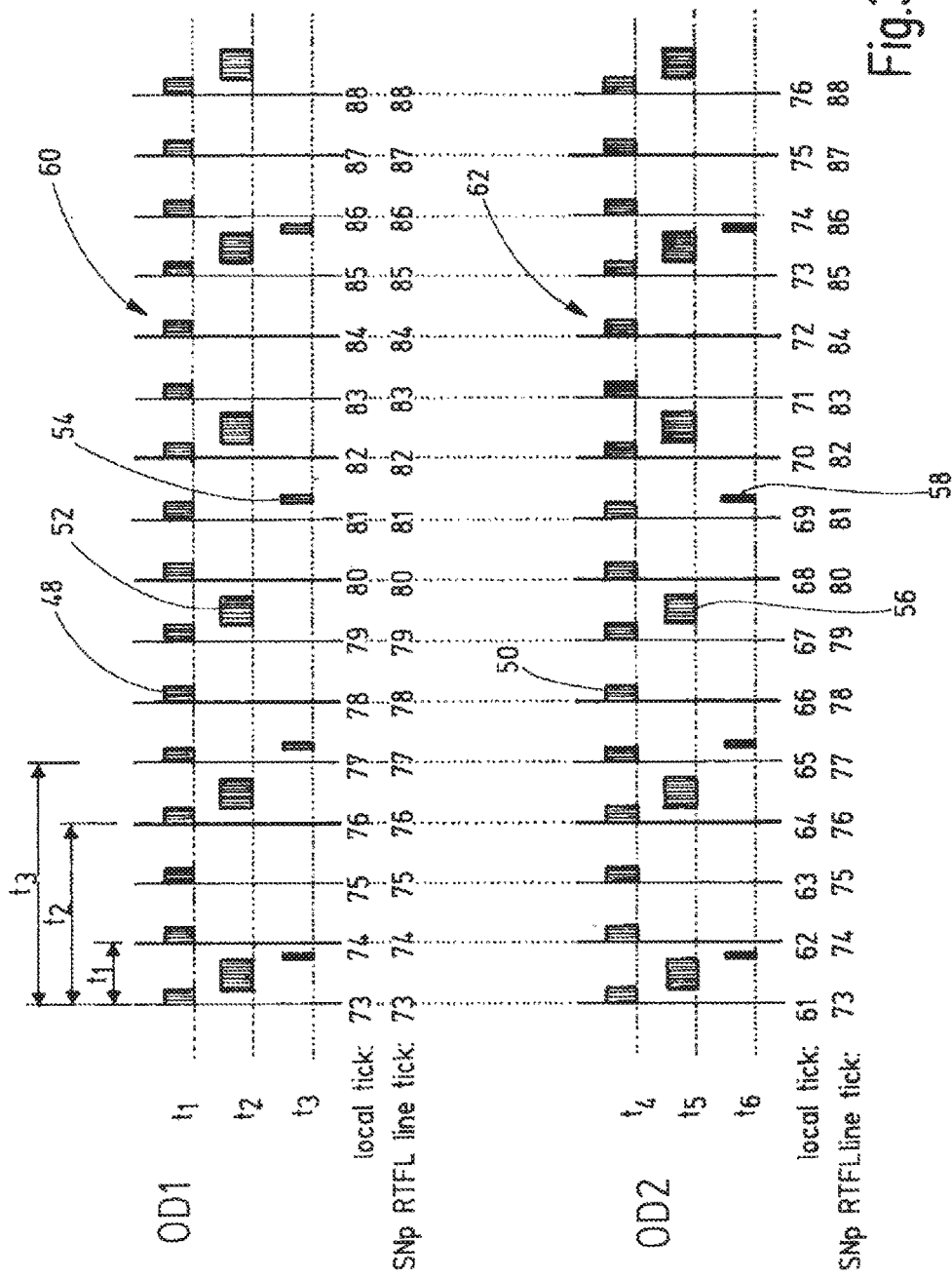

APPARATUS AND METHOD FOR CONTROLLING AN AUTOMATED INSTALLATION

CROSS-REFERENCES TO RELATED APPLICATIONS

This application claims priority under the Paris Convention from German patent application 10 2016 104 767.8 filed on Mar. 15, 2016 with the German Patent and Trademark Office. The entire content of this priority application is incorporated herein by reference.

BACKGROUND OF THE INVENTION

The present invention relates to an apparatus and a method for controlling an automated installation, particularly an apparatus and a method with synchronous execution of safety-relevant control tasks in an installation having controllers remote from one another.

It is known practice to equip distributed controllers in a spatially widespread installation with local clocks that are synchronized to one another. The synchronized clocks make it possible to execute control tasks at different locations in the installation largely at the same time, for example in order to cause multiple coordinated movements in an installation having multiple driven axes. By way of example, an internet publication from the German company Beckhoff entitled "EtherCAT Distributed Clocks", downloaded on Feb. 2, 2016, describes the principle of physically distributed clocks synchronized to one another in a control system. In this system, a controller referred to as the EtherCAT master sends a special synchronization message at short intervals of time, into which synchronization message another controller having a reference clock enters its current time. The synchronization message is read by further controllers in the system, known as the EtherCAT slaves, in order to synchronize the respective local time to the reference time. In order to take into account transfer times for the synchronization message to the different controllers, what is known as an offset measurement is performed for each controller involved and an offset time is computed that is taken into account for the synchronization of the clocks.

Another method for synchronizing physically distributed clocks in an automated installation is described in an internet publication from the German company Hirschmann entitled "White Paper—Precision Clock Synchronization", downloaded on Feb. 2, 2016, with reference to IEEE standard 1588. According to this method, a so-called master cyclically sends synchronization messages via a communication network to the connected slaves. At the same time, the master detects the time of sending of each synchronization message as accurately as possible, and it sends the detected time of sending to the connected slaves using a further message. The slaves each measure the time of arrival of these two messages as accurately as possible and can use this information to determine a correction value that is used to match the respective local clock in the slave to the time of the master. This is what is known as offset correction. In a further phase of the synchronization, the slaves measure the transfer time for a message to the master and back by sending an inquiry message and receiving a response message. Subsequently, the respective local clocks are adjusted by the individual transfer time to the master.

A further method for synchronizing the timing of subscribers in a network is disclosed by DE 10 2005 032 877 A1. In contrast to the method of IEEE 1588, the initiative for the timing synchronization always comes from a message receiver in this case. DE 10 2005 032 877 A1 proposes the application of this synchronization method particularly for a network via which safety-relevant control information is interchanged, such as the transmission of information that represents the operating state of an emergency-off device, for example. Safety-relevant control functions of this kind require a defined time response in order to guarantee the reaction time between operation of an emergency-off switch and shutdown of a dangerous drive, for example.

EP 1 521 145 A1 discloses a safety controller with monitoring of the safety-relevant reaction time, which determines the physical distance at which a light barrier needs to be spaced away from a dangerous press in order to allow safe stoppage of the press tool after the light barrier is broken before an injury can occur. The safety controller can operate with synchronized clocks in physically distributed input/output modules, and two physically separate modules interchange messages having timestamps, so that the respective receiver module can determine the message transfer times.

U.S. Pat. No. 7,366,774 B2 and DE 10 2008 007 672 A1 disclose further apparatuses having physically distributed controllers that execute safety-relevant control tasks. These apparatuses dispense with synchronizing local clocks in view of the associated complexity. Instead, these apparatuses monitor message transfer times within the communication network, and the respective message receivers have what is known as a time expectation by which a respective current control message needs to be received in order to guarantee failsafe operation of the installation.

Use of synchronous clocks in distributed controllers provides indisputable advantages as far as coordination of the timing of control tasks is concerned. However, it holds risks if safe operation of an installation (as defined in the relevant standards relating to machine safety, particularly EN 61508, EN 62061 and/or ISO 13849-1) is critically dependent on the synchronization. Failsafe synchronization of distributed clocks in a control system having safety-relevant tasks is unknown to date, which is why safety-relevant control tasks are normally not or at least not critically dependent on clock synchronization. This results in safety distances from dangerous installation parts needing to be chosen rather generously, which can be disadvantageous with respect to the costs and efficiency of an installation.

SUMMARY OF THE INVENTION

Against this background, it is an object of the present invention to provide an apparatus and a method of the type mentioned at the outset that allow shortened safety-relevant reaction times—and consequently shortened safety distances from dangerous installation parts—in an installation having a plurality of physically distributed controllers.

According to a first aspect of the invention, there is provided an apparatus for controlling an automated installation, comprising a plurality of physically distributed controllers that are connected to one another via a communication network and include at least a first controller and a second controller, and comprising a timer, wherein the first controller has a first local clock and cyclically executes a number of first control tasks that are used to control at least one first local actuator, wherein the second controller has a second local clock and cyclically executes a number of second control tasks that are used to control at least one second local actuator, wherein the first and second controllers each have a synchronization service that is used to synchronize the respective local clocks to a common reference clock, wherein the timer repeatedly sends a trigger message to the first and second controllers, wherein the first controller, on receiving the trigger message, determines a first local time and sends it to the second controller, wherein the second controller, on receiving the trigger message, determines a second local time and sends it to the first controller, wherein the first and second controllers each determine a difference between the first and second local times, and wherein the first controller controls the first local actuator on the basis of the difference and the second controller controls the second local actuator on the basis of the difference.

According to a further aspect of the invention, there is provided a method for controlling an automated installation having a timer and having a plurality of physically distributed controllers that are connected to one another via a communication network and include at least a first controller and a second controller, wherein the first controller has a first local clock and cyclically executes a number of first control tasks that are used to control at least one first local actuator, wherein the second controller has a second local clock and cyclically executes a number of second control tasks that are used to control at least one second local actuator, wherein the first and second controllers each have a synchronization service that is used to synchronize the respective local clocks to a common reference clock, and wherein the timer repeatedly sends a trigger message to the first and second controllers, the method comprising the following steps: the first controller, on receiving the trigger message, determines a first local time and sends it to the second controller, the second controller, on receiving the trigger message, determines a second local time and sends it to the first controller, the first and second controllers each determine a difference between the first and second local times, and the first controller controls the first local actuator on the basis of the difference and the second controller controls the second local actuator on the basis of the difference.

The new apparatus and the corresponding method use the generally well known technology of synchronizing local clocks in physically distributed controllers in order thereby to allow execution of control tasks at the same time (at least within the framework of the technically dependent tolerances) regardless of the location of execution. Accordingly, in the preferred exemplary embodiments, the first control tasks are dependent on the local first clock and, respectively, the first control tasks are executed on the basis of the first local clock, and the second control tasks are, in the preferred exemplary embodiments, dependent on the second local clock and are executed on the basis of the second local clock, respectively. Advantageously, the first and second controllers execute the first and second control tasks in sync.

Furthermore, the first and second controllers together monitor the clock synchronization by virtue of each of the two controllers determining a difference between the first local time of the first controller and the second local time of the second controller and taking this as a basis for controlling at least one respective local actuator. Determination of the respective local time is triggered by a common timer. If the local clocks separate to an excessive extent, each of the two controllers can identify this error on the basis of the difference and actuate, particularly shutdown, the at least one local actuator on the basis thereof.

The difference is determined in two separate channels in this case, namely in the first controller and in the second controller. The apparatus and the method therefore achieve redundancy, which is desirable in view of safety-relevant control functions, rather inexpensively. Redundancy makes it easier for the timer—as in preferred exemplary embodiments—to be implemented in non-failsafe form as defined in the relevant standards relating to machine safety, i.e. non-compliant to SIL2 of IEC 61508 and/or non-compliant to PL d of ISO 13849-1, for example. This is very advantageous in view of costs, since verification of a failsafe implementation for each component of a control system is complex and expensive.

It is particularly advantageous if neither the first controller nor the second controller has a reference clock to which the respective local clocks are synchronized, because the safe monitoring of the clock synchronization can therefore be distributed very flexibly to many controllers in a large installation without it mattering how the respective local clocks are synchronized to one another. By way of example, the clock synchronization can be effected based on IEEE 1588, but also based on another suitable method.

The novel apparatus and the novel method allow failsafe timing synchronism for physically distributed control tasks in a very simple and inexpensive manner, said timing synchronism additionally being largely independent of the underlying network structure and the communication protocols used. As a result, the novel apparatus and the novel method can be used instead of or in addition to known methods of temporal monitoring for safety-relevant control tasks. The novel apparatus and the novel method increase failsafety with respect to guaranteed reaction times and therefore allow minimization of safety distances. Accordingly, the aforementioned object is completely achieved.

In a preferred refinement of the invention, the timer is connected to the communication network in a manner physically separate from the first and second controllers.

In this refinement, the first and second controllers are on equal terms with respect to the timer. The timer can therefore be arranged "anywhere" within the system. This refinement affords great flexibility and simplifies the planning of the novel apparatus and of the corresponding method and allows retrofitting in existing installations. In some exemplary embodiments, the timer is also connected to the communication network that has the reference clock separately from the controller. This simplifies practical implementation still further.

In some refinements, the first and/or second controller can communicate with the timer bidirectionally via the communication network. This is advantageous so that the respective controller can individually determine the message transfer time for the trigger message from the timer to the controller by sending a request message and receiving an associated response message from the timer. In this case, the timer is advantageously implemented in a controller that participates in the "normal" and advantageously cyclic data traffic in the communication network.

In other refinements, the timer can communicate with the first and second controllers only unidirectionally (one way) by sending the trigger message. It cannot receive messages from the first and/or second controller, however. In some exemplary embodiments, the trigger message may be a wirelessly transmitted signal (radio signal), even if the further messages between the first and second controllers, including the respective transmission of the difference, are provided by wire. In principle, the trigger message could be a DCF 77 signal from a general timer for radio clocks or a comparable time signal.

In a further refinement, the first controller has a first parameter memory storing a first transfer time parameter that represents an expected transfer time for the trigger message from the timer to the first controller, wherein the first controller determines the first local time as a difference between a local trigger message reception time (on the first controller) and the first transfer time parameter. Preferably, the second controller has a corresponding (second) parameter memory that stores a second transfer time parameter that represents an expected transfer time for the trigger message from the timer to the second controller, and the second controller determines the second local time as a difference between a local trigger message reception time on the second controller and the second transfer time parameter.

In this refinement, the local time used for forming the difference is "corrected" by the particular expected message transfer time from the timer to the receiving controller. This advantageously applies to any controller whose local clock is synchronized and monitored based on the novel method. The refinement has the advantage that the monitoring concentrates on the synchronized clocks and can consequently be effected at a higher resolution and with lower tolerances.

In a further refinement, the first controller puts the first local actuator into a failsafe state when the difference exceeds a predefined threshold value. Advantageously, the second controller also puts the second local actuator into a failsafe state when the difference exceeds a predefined threshold value.

A failsafe state in terms of this refinement is a defined state of the respective actuator in which there is the lowest possible risk from the automated installation to the health or life of operators or the like. Very often and accordingly preferably, the failsafe state of the actuator corresponds to an idle state that the actuator is in when the automated installation or at least the actuator is de-energized or otherwise inoperative. In some preferred exemplary embodiments, the respective local actuator includes one or more electromechanical switching contacts that are open in the failsafe state. The refinement ensures that the automated installation or at least a dangerous part of this installation is put into a harmless state if the synchronization of the respective local clocks is no longer within the tolerances defined by the threshold value. Consequently, this refinement advantageously contributes to guaranteeing safety-relevant reaction times in the automated installation.

In a further refinement, the first controller reads in a first sensor state at at least one local sensor input and sends a process message having the first sensor state to the second controller. Advantageously, the second controller controls the second local actuator on the basis of the first sensor state. Furthermore, in some exemplary embodiments, it is preferred if the second controller reads in a second sensor state at at least one second local sensor input and sends a second process message having the second sensor state to the first controller, and the first controller controls the first local actuator on the basis of the second sensor state.

In this refinement, the second controller processes information from the first controller in order to control the second local actuator. In such a case, the guaranteed clock synchronization is of particular importance in order to ensure safe operation of the installation with minimum reaction times. The refinement is particularly advantageous if the automated installation has a plurality of interconnected but autonomously operational installation parts, as is the case with modern production lines in the automotive industry, for example. In some exemplary embodiments, the first controller controls a first installation part and the second controller controls a separate second installation part, with a workpiece handled by the first installation part being handed over to the second installation part. To optimize workflows, it is advantageous in an exemplary embodiment of this kind if each controller takes into consideration information from the respective other installation part. However, the optimum control sequence in this case is also dependent on the clock synchronization between the control parts being effected correctly. This requirement is met in a very advantageous manner with the novel apparatus and the corresponding method.

In a further refinement, the first controller controls a further actuator, which is locally connected to the first controller, independently of the difference. Advantageously, the second controller also controls a further actuator, which is locally connected to the second controller, independently of the difference.

In this refinement, the first controller is capable of operating independently to some extent, i.e. independently of the second controller and hence independently of the clock synchronization. The refinement has the advantage that the independent control part can continue to execute control tasks even if the clock synchronization is erroneous. The refinement allows very efficient and nonetheless failsafe installation operation.

In a further refinement, the second controller has a (second) clock control loop that slows down or speeds up the second local clock on the basis of the difference when the difference exceeds a predefined threshold value. Preferably, the first controller also has a corresponding (first) clock control loop that speeds up or slows down the first clock on the basis of the difference, particularly in the opposite direction to the local clock in the second controller.

In this refinement, the first and/or the second controller are capable of adjusting the respective local clock in order to restore clock synchronization in the event of error. The refinement allows fast and efficient restarting of an installation part that has shut down on account of erroneous clock synchronization. In some exemplary embodiments, it is advantageous if only the second controller or only the first controller has the clock control loop described in this refinement, in order to guarantee an explicit control response. In other exemplary embodiments, it is advantageous if the first and second controllers each have the described clock control loop in order to achieve particularly fast restoration of the clock synchronization by virtue of controls in opposite directions.

In a further refinement, the second controller has a guaranteed local time tolerance, and the clock control loop slows down or speeds up the second local clock within the guaranteed time tolerance until the difference falls below the predefined threshold value. In preferred refinements, this applies in a corresponding manner to the first controller.

This refinement results in the readjustment of the local clock in the second controller sometimes being effected deliberately more slowly than would technically be possible. Consequently, this refinement accepts the erroneous non-synchronization of the local clocks lasting for longer than is technically necessary. The advantage is that of guaranteeing observance of the local time tolerance in the second controller. The refinement therefore has the advantage that the independently running control processes can continue with the guaranteed time tolerance. The refinement allows very efficient and failsafe installation operation with distributed and networked controllers.

In a further refinement, the clock control loop synchronizes the second local clock to a defined offset with respect to the reference clock. Advantageously, this also applies in a corresponding manner to the first controller.

In this refinement, the clock control loop in the second controller is designed to carry out resynchronization only with a view to relative synchronous operation of the second local clock, but not with respect to absolute synchronous operation to the reference clock. The refinement has the advantage that the difference assumes a tolerable value again relatively quickly. Advantageously, the respective controller is designed to adapt the defined threshold value on the basis of the offset. The refinement allows a faster return to operation of the controllers with the synchronized clocks.

In a further refinement, the second controller cyclically executes a plurality of second control tasks having mutually different cycle times on the basis of the second local clock.

In this refinement, a plurality of second control tasks are dependent on the successful and, based on the novel method, guaranteed synchronization of the local clocks in the first and second controllers. The refinement allows particularly efficient execution of numerous different control tasks, since, to a certain extent, central monitoring of the clock synchronization is effected. In preferred exemplary embodiments, the first controller also executes a plurality of first control tasks having different cycle times on the basis of the first local clock, which increases the efficiency of the novel apparatus and the novel method once again.

In a further refinement, the first and second controllers each have a processing part implemented in a failsafe manner and having a time expectation for the trigger message.

A time expectation in terms of this refinement involves the relevant controller expecting repeated reception of the trigger message within predefined intervals of time and, if need be, if the trigger message fails to appear, initiating an error reaction, which can particularly involve shutting down the first or second local actuator, in the next expectation interval. The refinement allows an inexpensive and flexible implementation of the novel apparatus and a correspondingly simple implementation of the novel method, since the timer can be implemented in a non-failsafe manner in this refinement without jeopardizing failsafety as defined in the aforementioned standards. On the other hand, this refinement is particularly advantageous because the monitoring of the time synchronization allows minimum guaranteed shutdown and reaction times, which is of great advantage particularly for the implementation of safety-relevant control tasks.

In a further refinement, the novel apparatus and the corresponding method use a third controller that has a third local clock and cyclically executes third control tasks, wherein the third controller, on receiving the trigger message, determines a third local time and sends it to the first controller, and wherein the first controller determines a further difference between the first and third local times and takes the further difference as a basis for controlling the first local actuator.

In this refinement, the first controller monitors a further clock synchronization on the basis of a further difference that is advantageously separate from the (first) difference that is evaluated in cooperation with the second controller. Advantageously, the novel apparatus and the corresponding method of this refinement monitor the clock synchronization for a plurality of controllers in respective pairs. In general, it is advantageous within the framework of this refinement if the first controller monitors, for each FS communication link to another controller, an associated clock synchronization on the basis of a difference formed in pairs. FS communication in this context is communication by the first controller with another controller in which safety-relevant information as defined in the standards indicated above is interchanged. The refinement has the advantage that the safety-relevant shutdown of a local actuator on the first controller is effected only if the relevant actuator is affected by the possibly failed clock synchronization. The refinement therefore increases the availability of installation parts with a high level of failsafety.

It goes without saying that the features mentioned above and those yet to be explained below can be used not only in the respectively indicated combination but also in other combinations or on their own without departing from the framework of the present invention.

BRIEF DESCRIPTION OF THE DRAWINGS

Exemplary embodiments of the invention are depicted in the drawing and are explained in more detail in the description below. In the drawing:

FIG. 3 shows two timing diagrams that represent the cyclic execution of control tasks on two controllers of the apparatus from FIG. 1.

DESCRIPTION OF PREFERRED EMBODIMENTS

Figure 1:
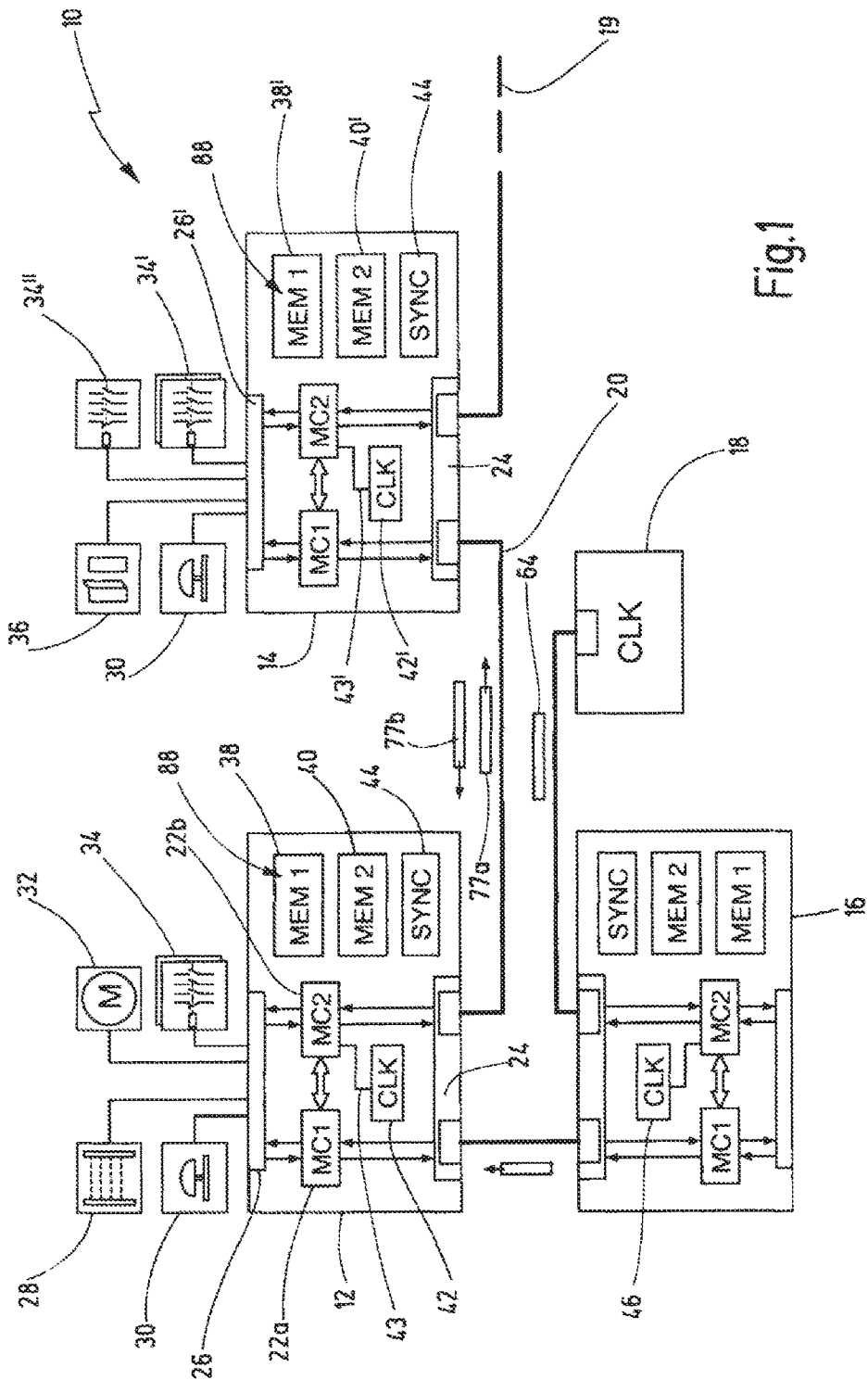
FIG. 1 shows a schematic illustration of an exemplary embodiment of the novel apparatus.

In FIG. 1, an exemplary embodiment of the novel apparatus is denoted in its entirety by reference numeral 10. The apparatus 10 includes a first controller 12, a second controller 14, a third controller 16, a timer 18 and a communication network 20, via which the controllers and the timer are connected to one another. In some preferred exemplary embodiments, the communication network 20 is an Ethernet network that is designed for failsafe communication between controllers for the automated control of a machine installation. By way of example, it is a communication network offered under the trade name SafetyNET p by Pilz GmbH & Co. KG, Germany. Generally, the communication network 20 may also be based on a different communication protocol, such as Profinet/Profisafe, and/or include wireless transmission links. In all preferred exemplary embodiments, the controllers 12, 14, 16 communicate with one another cyclically via the communication network 20, as is customary and known for the communication of distributed controllers. There may be further controllers connected to the communication network 20, as indicated symbolically at reference numeral 19.

Advantageously, the first controller in this case has a failsafe design as defined by SIL2 or above according to EN 61508 and/or by PL d or above according to ISO 13849-1. In the preferred exemplary embodiments, the first controller has two redundant processing channels, depicted here in simplified form by a first microcontroller 22a and a second microcontroller 22b. Alternatively or additionally, the two redundant signal processing channels may be wholly or partially realized using other logic circuits, for example microprocessors, ASICs and/or FPGAs. The text below refers to the two microcontrollers 22a, 22b for the sake of simplicity, without this being intended to exclude other failsafe implementations as defined in the aforementioned standards.

In this case, the two microcontrollers 22a, 22b advantageously operate redundantly in respect of one another, receiving process data from connected sensors and/or other controllers. Accordingly, the first controller 12 in this case has a network interface 24, via which the controller 12 is connected to the communication network 20, and an I/O interface 26, to which local sensors and/or actuators can be connected. By way of example, FIG. 1 depicts a light grid 28, an emergency-off switch 30, an electric drive 32 and multiple contactors 34, which are connected to the first controller 12 via the I/O interface 26. The symbolic illustration primarily shows safety-relevant sensors, such as particularly the emergency-off switch 30. In principle, however, it is also possible for non-safety-relevant sensors to be connected to the controller 12. Similarly, non-safety-relevant actuators may be connected to the controller 12, as shown in this case by way of example using the drive 32. Non-safety-relevant sensors and actuators are used primarily to produce what is known as standard control process of an automated installation. In the preferred exemplary embodiments, the apparatus 10 is capable of carrying out both failsafe FS control and standard control of an automated installation.

In some exemplary embodiments, the controller 12 is designed to combine the process data using the microcontrollers 22a, 22b according to a predefined logic and to take this as a basis for generating control data for controlling the actuators. Accordingly, the first control tasks may include receiving and logically combining process data and also generating control signals for the actuators. In these exemplary embodiments, controller 12 therefore has a control function in terms of a PLC (programmable logic controller). In other exemplary embodiments, controller 12 may be a pure I/O device (input and/or output device), the main function of which substantially is to receive process data from the connected sensors and to send them to other controllers (for logic combination therein) and/or to accept control data for actuating the actuators and to take this as a basis for operating the actuators. Accordingly, the first control tasks in these exemplary embodiments primarily include the receiving and sending of the process data from connected sensors and/or the acceptance of control data and the operation or non-operation of actuators. Furthermore, the controller 12 may have, in further exemplary embodiments, a hybrid functionality, so that it firstly carries out a control function in terms of a PLC and secondly acts as an I/O device.

In some preferred exemplary embodiments, the second controller 14 is designed in the same way as the first controller 12, although this is not absolutely necessary. By way of example, the second controller 14 may be a pure I/O device, while the first controller 12 carries out a control function in terms of a PLC, or vice versa. By way of example, in FIG. 1, an emergency-off switch 30 and a guard door switch 36 and also multiple contactors 34 are connected to the I/O interface 26 of the second controller 14. The guard door sensor 36 is a further example of a safety-relevant sensor that is typically used for FS control of an automated installation.

The first controller 12 in this case has one or more memories for storing a user program that is executed on the first controller 12 and for storing parameters and/or process data. By way of example, a first memory 38 and a second memory 40 are shown here. In some exemplary embodiments, the first controller 12 has multiple separate memories 38, 40, each microcontroller 22 having exclusive access to one of the two memories 38, 40. In other exemplary embodiments, the memories 38, 40 may be separate memory areas within a contiguous memory. The memories 38, 40 may be or may include non-volatile and/or volatile memories.

Reference numeral 42 indicates a local clock that provides a local timebase or a local system clock in the first controller 12 and can be adjusted forward or backward using a clock control loop 43. In the preferred exemplary embodiments, all of the control tasks in the controller 12 are performed at cyclically recurring intervals that are dependent on the local clock 42. Comparably, the second controller 14 has a second local clock 42' that provides a local timebase for the second control tasks, which are executed using the second controller 14. The second clock can be adjusted forward or backward using a second clock control loop 43' in the second controller 14. By way of example, the clock control loops 43, 43' are in this case indicated by a connection to the respective second microcontroller 22b. Advantageously, the clock control loop can therefore include a software application that is executed on the microcontroller. Alternatively or additionally, the clock control loop could be realized using a different logic circuit, for example using the first microcontroller or a further circuit, which is not shown here.

In the preferred exemplary embodiments, the first controller 12 and the second controller 14 execute their respective control tasks largely in sync. It is therefore desirable for the local clocks 42, 42' to run in sync with one another. To achieve this, the first and second controllers 12, 14 each have a synchronization service 44. In the preferred exemplary embodiments, the synchronization service 44 is a cyclically repeated task that is executed by at least one of the microcontrollers 22a, 22b and ensures that the respective local clock 42, 42' is synchronized to an external reference clock. By way of example, the synchronization service 44 could carry out clock synchronization based on the IEEE 1588 protocol. In this exemplary embodiment, the reference clock is arranged in the third controller 16 which may be a master control unit in the apparatus 10, for example. In some exemplary embodiments, the first controller 12 and the second controller 14 are subordinate control units and/or local I/O units that are firstly capable of executing local control tasks and secondly deliver process data to the master control unit 16. In other exemplary embodiments, the controllers 12, 14, 16 each are independently operating controllers that, by way of example, control different machine modules of a complex installation and interchange information with one another so that the different installation parts cooperate smoothly. Accordingly, the third controller 16 may be designed in the same way as the first controller and/or second controller, as shown in simplified form in FIG. 1. It goes without saying that suitable sensors and/or actuators may also be connected to the third controller 16.

FIG. 3 illustrates the cyclic execution of first and second control tasks on the first controller 12 (in this case denoted by OD1) and the second controller 14 (in this case denoted by OD2). FIG. 3 shows, from left to right, a time axis that is divided into multiple time intervals $t_1, t_2, t_3$. In each time interval, one or more control tasks 48, 50, 52, 54, 56, 58 are executed. By way of example, the first controller 12 (OD1) executes the control tasks 48, 52, 54 in a cyclically recurring manner. This involves the control task 48 being repeated at shorter intervals of time than the control task 52, and the latter in turn being repeated at shorter intervals of time than the control task 54. The first control task 48 is intended to be executed as synchronously as possible with the second control task 50 on the second controller 14 (OD2).

In the preferred exemplary embodiments, the first control tasks 48, 52, 54 are executed on the first controller 12 (OD1) in local time intervals 60 that are dependent on the local clock 42. The second control tasks 50, 56, 58 are executed on the second controller 14 (OD2) in time intervals 62 that are dependent on the local clock 42'. FIG. 3 depicts the dependency on the respective local clock using what is known as a "local tick", i.e. using a local beat that the respective local clock generates. As depicted in FIG. 3, the local beats do not necessarily have to indicate an identical absolute time. It is sufficient in the preferred exemplary embodiments if the respective local beats are in sync relative to one another.

FIG. 3 further indicates what is known as a "line tick". This is a time-base that is provided, in the preferred exemplary embodiments, via the communication network 20, particularly using cyclically sent messages from the master control unit. In some exemplary embodiments, the timebase of the communication network 20 therefore represents a common system time that governs the reciprocal communication of the controllers 12, 14, 16 among one another. In some exemplary embodiments, the respective synchronization service 44 in the controllers 12, 14 ensures that the respective local clock 42, 42' and the "line tick" are in sync with one another.

In the preferred exemplary embodiments, the synchronous execution of the first control tasks 48, 52, 54 and the second control tasks 50, 56, 58 is not only ensured using the synchronization service 44 on the respective controllers 12, 14 but is additionally monitored in a failsafe manner by virtue of the first controller 12 and the second controller 14 each determining, in sync with one another, a local time that represents the respective local reception of an external common trigger message. In the preferred exemplary embodiments, this trigger message is initiated by the timer 18 and is denoted by the reference numeral 64 in FIG. 1. In some preferred exemplary embodiments, the trigger message is a data message that is transmitted to the first, second and third controllers 12, 14, 16 via the communication network 20. In some exemplary embodiments, the timer 18 is a timer chip of non-failsafe design that one of the controllers connected to the communication network 20 contains. In other exemplary embodiments, the timer chip 18 may be connected to the communication network 20 separately from all controllers that read in sensors and/or actuate actuators. In some exemplary embodiments, the timer 18 may be implemented in a controller together with the reference clock 46. In other exemplary embodiments, the timer 18 may transmit the trigger message 64 to the controllers 12, 14, 16 wirelessly and separately from the other messages in the communication network 20. Advantageously, the timer 18 generates the trigger message 64 at cyclically recurring intervals that are more than ten times longer than the time intervals 60, 62 that the local clocks use to initiate the cyclic execution of the control tasks on the controllers.

Figure 2:
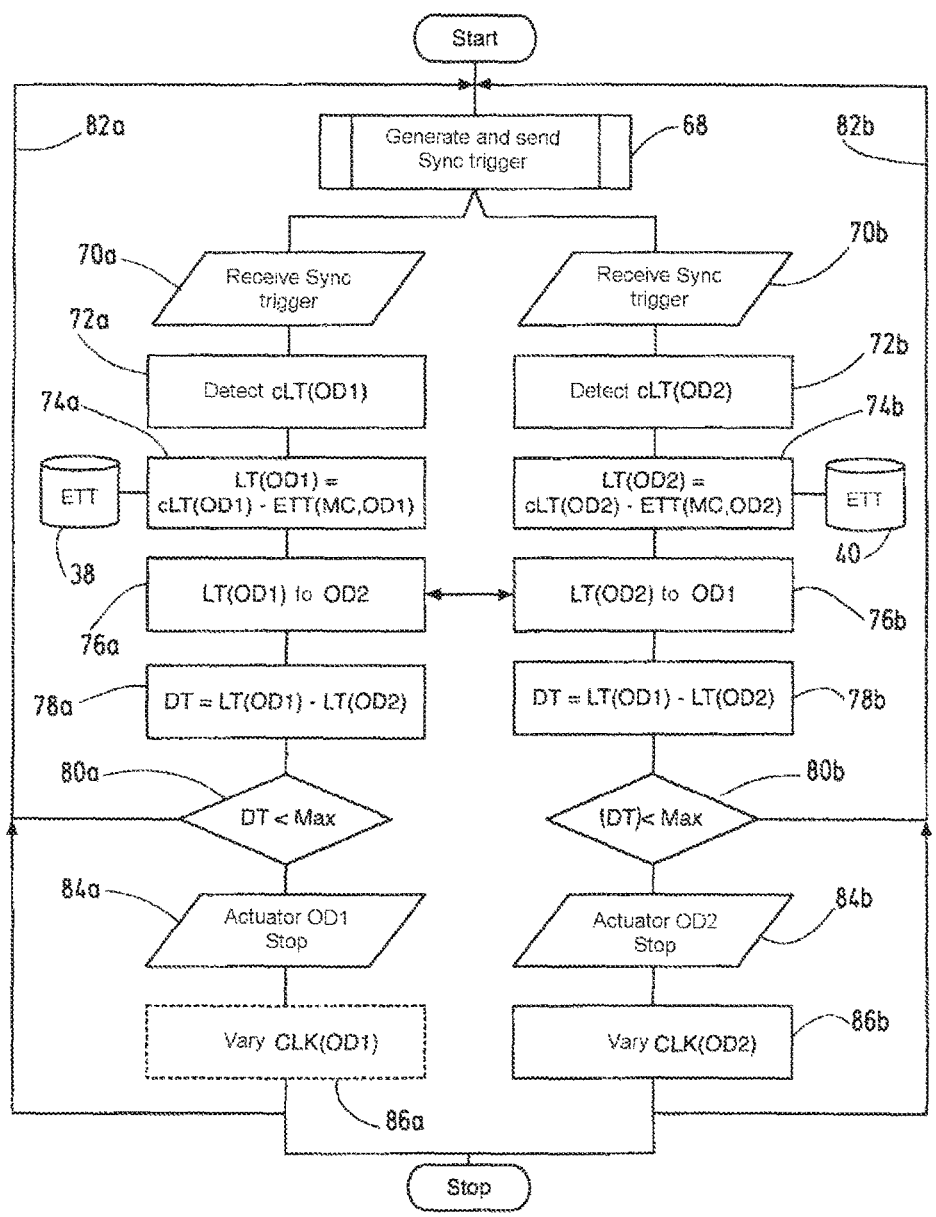
FIG. 2 shows a flowchart to explain an exemplary embodiment of the novel method implemented in the apparatus from FIG. 1.

A preferred exemplary embodiment of the novel method is explained below with reference to FIG. 2. According to step 68, the timer 18 generates the trigger message 64 and sends it to all controllers in which the novel method is implemented. For the sake of simplicity, this method is depicted below using two controllers only, which are denoted by OD1 and OD2 and may be the first controller 12 and the second controller 14, for example. In the preferred exemplary embodiments, the method described is also implemented between further controllers, however, for example between the first controller 12 and the third controller 16.

The controllers 12, 14 each receive the trigger message from the timer 18, this being illustrated by steps 70a, 70b. The controllers receive the trigger message 64 from the timer 18 at approximately the same time, but not necessarily exactly at the same time, because the transfer time for the trigger message 64 from the timer 18 to the respective controller 12, 14 may be different.

According to steps 72a, 72b, each controller uses its local clock to detect the instant at which it receives the trigger message 64. The relevant instant is denoted by cLT (ODx) in FIG. 2, where "x" denotes the respective device.

In the preferred exemplary embodiments, each controller computes a corrected local reception time by subtracting a parameter ETT (MC, ODx), which is stored in the relevant memory 38, 38' of the respective controller, from the reception time detected in step 72a, 72b. The parameter ETT (MC, ODx) represents an expected or usual transfer time for the trigger message from timer 18 to the respective controller. In this way, some preferred exemplary embodiments allow for the different transfer time for the trigger message to the respective controller.

According to step 76a, 76b, each of the two controllers subsequently sends the corrected local reception time (local time LT (ODx)) to the respective other controller. FIG. 1 accordingly indicates two messages 77a, 77b. According to step 78a, 78b, each of the two controllers involved then computes a difference DT between the corrected local reception time of the first controller and the corrected local reception time of the second controller. Subsequently, each of the two controllers compares the computed difference with a defined threshold value according to step 80. If the absolute value of the computed difference is below the defined threshold value, then the method returns to step 68. The local clocks 42, 43 in the two affected controllers then operate sufficiently in sync with one another, since the respectively computed difference between the local reception times of the trigger message 64 is less than a defined tolerance, which is represented by the chosen threshold value in step 80a, 80b. If the absolute value of the computed difference DT exceeds the defined threshold value, on the other hand, then the respective controller stops at least one local actuator according to step 84. In the preferred exemplary embodiments, the respective controller stops a local actuator whose actuation involves sensor data that come from a sensor on the respective other controller being processed. In this case, "stopping" the actuator means that the relevant actuator is put into a state that guarantees failsafe operation of the automated installation. By way of example, it would thus be possible to stop the drive 32 on the first controller 12 and/or for the controllers 12, 14 to each shut down a local contactor 34.

According to step 86, the second controller 14 further varies the local clock 42' on the basis of whether the local clock 42' runs more quickly or more slowly than the local clock 42 in the first controller, in order thereby to achieve synchronous operation of the local clocks within the defined tolerance limits again. In some preferred exemplary embodiments, the first controller also varies the local clock in the opposite direction, i.e. the local clock in the first controller is speeded up when the local clock in the second controller is slowed down, and vice versa, in order thereby to achieve fast resynchronization of the two local clocks within the set tolerance limits.

In preferred exemplary embodiments, the clock control loop varies the respective local clock within a guaranteed time tolerance, which is stored as a parameter in the memory 38, 40 of the respective controller. The guaranteed time tolerance defines a range of variation within which the respective local clock of the controller can fluctuate to the maximum.

In preferred exemplary embodiments, each of the controllers 12, 14 has a time expectation 88 that is stored as a parameter in one of the memories 38, 40 and that defines a time interval that begins with reception of a first trigger message 64 and within which a further trigger message 64 needs to be received. In this way, each of the controllers 12, 14 monitors the cyclic reception of the trigger messages 64. If a trigger message 64 fails to appear within the time expectation 88, then the relevant controller 12, 14 switches at least one local actuator to a failsafe state (idle state).

What is claimed is:

1. An apparatus for controlling an automated installation, comprising:
   a plurality of physically distributed controllers that are connected to one another via a communication network and include at least a first controller and a second controller, and
   a timer,
   wherein the first controller has a first local clock and cyclically executes a number of first control tasks that are used to control at least one first local actuator,
   wherein the second controller has a second local clock and cyclically executes a number of second control tasks that are used to control at least one second local actuator,
   wherein the first and second controllers each have a synchronization service that is used to synchronize the respective local clocks to a common reference clock,
   wherein the timer repeatedly sends a trigger message to the first and second controllers, wherein the first controller, on receiving the trigger message, determines a first local time and sends it to the second controller,
   wherein the second controller, on receiving the trigger message, determines a second local time and sends it to the first controller,
   wherein the first and second controllers each determine a difference between the first and second local times, and
   wherein the first controller controls the first local actuator on the basis of the difference and the second controller controls the second local actuator on the basis of the difference.

2. The apparatus of claim 1, wherein the timer is connected to the communication network in a manner physically separate from the first and second controllers.

3. The apparatus of claim 1, wherein the first controller has a first parameter memory storing a first transfer time parameter that represents an expected transfer time for the trigger message from the timer to the first controller, and wherein the first controller determines the first local time as a difference between a local trigger message reception time) and the first transfer time parameter.

4. The apparatus of claim 1, wherein the first controller puts the first actuator into a failsafe state when the difference exceeds a predefined threshold value.

5. The apparatus of claim 1, wherein the first controller reads in a first sensor state at at least one local sensor input and sends a process message including the first sensor state to the second controller, and the second controller controls the second local actuator on the basis of the first sensor state.

6. The apparatus of claim 1, wherein the first controller controls a further actuator, which is locally connected to the first controller, independently of the difference.

7. The apparatus of claim 1, wherein the second controller has a clock control loop that slows down or speeds up the second clock on the basis of the difference when the difference exceeds a predefined threshold value.

8. The apparatus of claim 7, wherein the second controller has a guaranteed time tolerance, and wherein the clock control loop slows down or speeds up the second local clock within the guaranteed time tolerance until the difference falls below the predefined threshold value.

9. The apparatus of claim 1, wherein the clock control loop synchronizes the second local clock to a defined offset with respect to the reference clock.

10. The apparatus of claim 1, wherein the second controller cyclically executes a plurality of second control tasks having mutually different cycle times on the basis of the second local clock.

11. The apparatus of claim 1, wherein the first and second controllers each have a processing part implemented in a failsafe manner and having a time expectation for the trigger message.

12. The apparatus of claim 1, further comprising a third controller that has a third local clock and cyclically executes third control tasks, wherein the third controller, on receiving the trigger message, determines a third local time and sends it to the first controller, and wherein the first controller determines a further difference between the first and third local times and controls the local first actuator on the basis of the further difference.

13. A method for controlling an automated installation having a timer and having a plurality of physically distributed controllers that are connected to one another via a communication network and include at least a first controller and a second controller, wherein the first controller has a first local clock and cyclically executes a number of first control tasks that are used to control at least one first local actuator, wherein the second controller has a second local clock and cyclically executes a number of second control tasks that are used to control at least one second local actuator, wherein the first and second controllers each have a synchronization service that is used to synchronize the respective local clocks to a common reference clock, and wherein the timer repeatedly sends a trigger message to the first and second controllers, the method comprising the following steps:
   the first controller, on receiving the trigger message, determines a first local time and sends it to the second controller,
   the second controller, on receiving the trigger message, determines a second local time and sends it to the first controller,
   the first and second controllers each determine a difference between the first and second local times, and
   the first controller controls the first local actuator on the basis of the difference and the second controller controls the second local actuator on the basis of the difference.

14. A computer program product comprising program code stored on a non-transitory data storage medium and configured to carry out a method for controlling an automated installation having a timer and having a plurality of physically distributed controllers that are connected to one another via a communication network and include at least a first controller and a second controller, wherein the first controller has a first local clock and cyclically executes a number of first control tasks that are used to control at least one first local actuator, wherein the second controller has a second local clock and cyclically executes a number of second control tasks that are used to control at least one second local actuator, wherein the first and second controllers each have a synchronization service that is used to synchronize the respective local clocks to a common reference clock, and wherein the timer repeatedly sends a trigger message to the first and second controllers, the method comprising the following steps:

the first controller, on receiving the trigger message, determines a first local time and sends it to the second controller, the second controller, on receiving the trigger message, determines a second local time and sends it to the first controller, the first and second controllers each determine a difference between the first and second local times, and the first controller controls the first local actuator on the basis of the difference and the second controller controls the second local actuator on the basis of the difference.

\* \* \* \* \*